No. 664,164. Patented Dec. 18, 1900.
N. MARTIN.
SHUTTER RETAINER.
(Application filed Feb. 17, 1900.)
(No Model.)
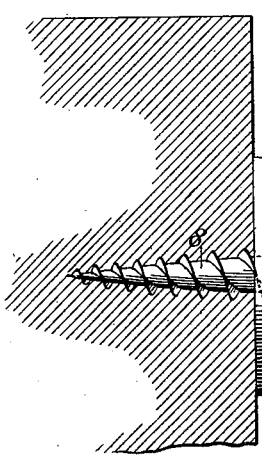
Fig. 1.
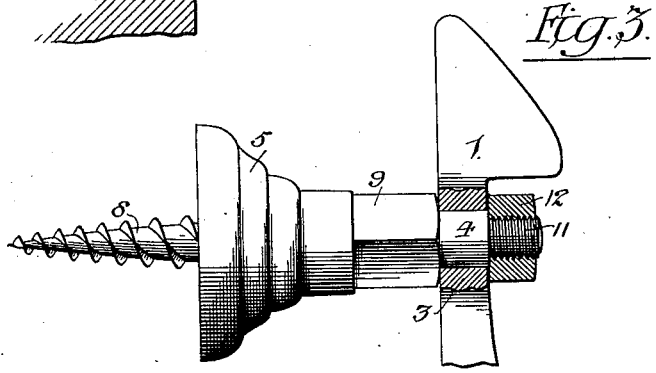
Fig. 3.
Fig. 2.
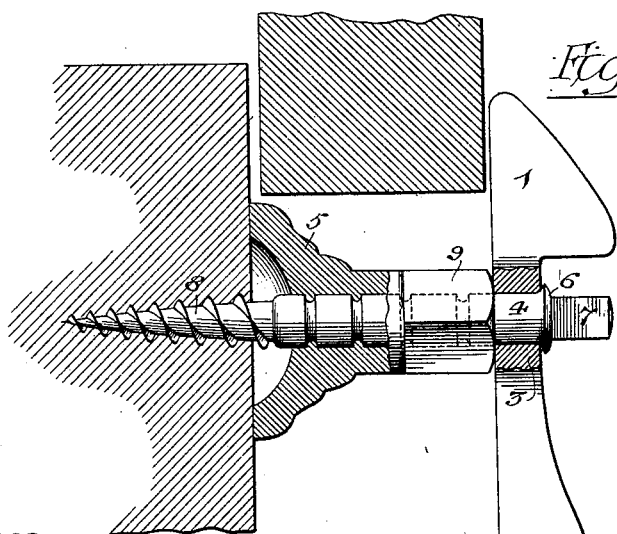
Witnesses:-
Louis M. F. Whitehead
F. E. Bechtold
Inventor:-
Nehemiah Martin
by his Attorneys

United States Patent Office.

NEHEMIAH MARTIN, OF PLEASANTVILLE, NEW JERSEY.

SHUTTER-RETAINER.

SPECIFICATION forming part of Letters Patent No. 664,164, dated December 18, 1900.

Application filed February 17, 1900. Serial No. 5,583. (No model.)

*To all whom it may concern:*

Be it known that I, NEHEMIAH MARTIN, a citizen of the United States, and a resident of Pleasantville, Atlantic county, New Jersey, have invented certain Improvements in Shutter-Retainers, of which the following is a specification.

The object of my invention is to so construct a shutter-retainer that the same can be secured in position upon the window-sill or side of a house more readily and conveniently than usual. This object I attain in the manner hereinafter set forth, reference being had to the accompanying drawings, in which—

Figure 1 is a side view, partly in section, of a shutter-retainer constructed in accordance with my invention. Fig. 2 is a sectional view showing a portion of the shutter and also illustrating a modification of the invention; and Fig. 3 is a view similar to Fig. 1, but illustrating another embodiment of my invention.

The ordinary form of shutter-retainer, having a cam-shaped head and depending weight, is hung to a stud or pin projecting from a plate which is secured to the window-sill or side of the house by a number of ordinary wood-screws, and the insertion of these screws is often a matter of great difficulty, as the workman must lean out of the window to one side or the other under conditions which render it inconvenient and difficult and oftentimes dangerous to manipulate a screw-driver. My improved shutter-retainer is therefore so constructed that in its preferred form it can be secured in position by simply turning the retainer, the latter acting as a wrench, or in its other forms by means of an ordinary wrench, the manipulation of which can be effected much more readily and conveniently than that of a screw-driver.

In the drawings, 1 represents the cam-like head of the retainer, and 2 the depending weighted portion of the same, the intermediate portion or hub 3 of the retainer being hung upon a stud 4, which projects outwardly from a boss 5, the latter having a bearing upon the window-sill or upon the side of the house and the retainer being held in position longitudinally by riveting a portion 6 of the stud beyond the retainer. The stud 4 has a tapered and threaded inner end 8, which can be screwed into the window-sill or into a side of the house, and the boss 5 is cast upon and around the stud 4, and in order to insure a better hold of the boss upon the stud the latter may be notched or grooved, as shown in Fig. 2.

The boss 5 of the hanger (shown in Fig. 1) has at the outer end a lug 13, and on the inner side of the depending portion 2 of the retainer is a lug 14, which when the retainer has been turned end for end will engage the lug 13, so that the retainer serves as a wrench, whereby the threaded end of the stud can be screwed into the window-sill or the siding of the house, this operation being performed without any of the inconvenience or danger involved in the use of a screw-driver.

The lugs 13 and 14 do not interfere with the free swinging of the retainer to the extent necessary in the normal use of the same.

Instead of using the retainer as a wrench the hanger may be constructed for operation by a special wrench, if desired. For instance, in Fig. 2 I have shown the stud 4 as provided beyond the riveted portion 6 with a square projection 7 for the reception of a wrench, and the outer end of the boss 5 is also squared, as shown at 9, for the same purpose.

In some cases the stud may have a threaded outer end, as shown, for instance, at 11 in Fig. 3, this portion of the stud being intended for the reception of a nut 12, which serves to hold the retainer in place on the stud and also as a means whereby the stud may be turned by means of a wrench in order to screw its projecting threaded end 8 into the window-sill or side of the house.

Having thus described my invention, I claim and desire to secure by Letters Patent—

1. The combination of a swinging shutter-retainer hanger, comprising a stem or stud having a bearing-boss longitudinally immovable with respect to said stud, an inwardly-projecting threaded end, an outwardly-projecting end upon which the retainer can be hung, and a portion whereby the hanger may be readily turned, with a retainer independent of the bearing-boss, said retainer being hung upon the outer end of the hanger, so as to swing in a plane transverse to the axis of the said hanger, substantially as specified.

2. The combination of the hanger comprising a stem or stud having an inwardly-projecting threaded end, an outwardly-projecting portion upon which the retainer can be pivoted so as to be free to swing, and a boss longitudinally immovable with respect to said stud intervening between said threaded and pivoted portions, with said pivoted retainer, the latter being independent of the boss and free to swing in a plane transverse to the axis of the hanger, and means whereby the retainer can be caused to engage with the hanger, so as to act as a wrench for turning the latter, substantially as specified.

3. The combination of the hanger having a bearing-boss with internally-projecting threaded stem and outwardly-projecting stud said boss being longitudinally immovable with respect to said stud, the hanger independent of the bearing-boss and longitudinally confined to but free to swing upon said stud in a direction transverse to the axis of the hanger, a lug upon the hanger, and a lug upon the swinging retainer adapted to engage with that upon the hanger, substantially as specified.

In testimony whereof I have signed my name to this specification in the presence of two subscribing witnesses.

NEHEMIAH MARTIN.

Witnesses:
FRANK E. BECHTOLD,
JOS. H. KLEIN.